(12) United States Patent
Chung et al.

(10) Patent No.: US 7,209,303 B2
(45) Date of Patent: Apr. 24, 2007

(54) METHOD FOR BALANCING COLOR WHEEL AND STRUCTURE THEREOF

(75) Inventors: Chin-Ming Chung, Hsinchu (TW); Pi-Tsung Hsu, Hsinchu (TW); Chien-Chih Lai, Hsinchu (TW)

(73) Assignee: Premier Image Technology Corporation, Taipei (TW)

( * ) Notice: Subject to any disclaimer, the term of this patent is extended or adjusted under 35 U.S.C. 154(b) by 0 days.

(21) Appl. No.: 11/004,854

(22) Filed: Dec. 7, 2004

(65) Prior Publication Data

US 2005/0275961 A1 Dec. 15, 2005

(30) Foreign Application Priority Data

Jun. 11, 2004 (TW) .............................. 93116882 A

(51) Int. Cl.
*G02B 5/22* (2006.01)
(52) U.S. Cl. .................. 359/891; 359/885; 359/889; 348/743; 356/418; 353/84; 362/293
(58) Field of Classification Search ................ 359/891, 359/892, 885, 889; 348/743; 356/418; 353/84; 362/293
See application file for complete search history.

(56) References Cited

U.S. PATENT DOCUMENTS

| | | | |
|---|---|---|---|
| 5,868,482 A | * | 2/1999 | Edlinger et al. ............... 353/84 |
| 6,715,887 B2 | * | 4/2004 | Chang .......................... 353/84 |
| 6,747,803 B2 | * | 6/2004 | Hung .......................... 359/634 |
| 2006/0132948 A1 | * | 6/2006 | Kao et al. .................... 359/892 |

* cited by examiner

*Primary Examiner*—Leonidas Boutsikaris
(74) *Attorney, Agent, or Firm*—Birch, Stewart, Kolasch, and Birch, LLP

(57) ABSTRACT

A method for balancing a color wheel. The rotational unbalance vector of a driving motor is measured, including its unbalance amount and direction. The unbalance of a color wheel is adjusted to make its unbalance amount to be the same of the driving motor. The color wheel is connected to the driving motor so that the unbalance direction thereof is opposite to each other to reach an expected balance. The color wheel structure includes a set of color filter and a ring, before starting the assembly, adjusting the unbalance vector of the ring and motor shaft first, and then to assemble it and make the unbalance vectors opposite.

17 Claims, 3 Drawing Sheets

| STEP (a): measuring rotational deviation vector (F1) from driving motor (30) | STEP (b): adjusting rotational deviation factor (F2) on color wheel, unti its deviation amount same to rotational deviation vactor (F1). | STEP (c): connecting the color wheel to the driving motor (30) in opposit deviation direction. |

METHOD FOR BALANCING COLOR WHEEL AND STRUCTURE THEREOF

FIELD OF THE INVENTION

The present invention relates to an assembly method for color wheel and the resultant structure; and, more specifically, to a method comprising a step of measuring the rotational unbalanced vectors of a motor and a color wheel, and assembling them in opposite directions.

BACKGROUND OF THE INVENTION

Digital Light Processing (DLP) has been well developed and applied in digital projectors. Recently, the digital projector has shown a high potential to share traditional liquid crystal projector market; meanwhile, the key element, the so-called color wheel for carrying a set of color filters has played an important role in determining the quality of the projector. For instance, while the color wheel rotates in an extremely high speed, any rotational unbalance which occurs shall generate a high frequency noise, which would damage the manufacturer's goodwill. Therefore, improving the rotational balance of the color wheel in a better assembly process would be highly desirable in the art. Even a small breakthrough in structure or method would be helpful for the company's potential in market competition and reputation, by allowing no defect therein.

For structural concepts, design limitations and material choice to manufacture a color wheel, the readers may refer to U.S. Pat. Nos. 5,868,482 and 6,024,453 which is not repeated. However, the present invention would focus on how to assemble a color wheel to get a perfect rotational balance, which has not been taught in the related patents.

Currently, there are two major traditional methods for balancing a color wheel. Referring to FIG. 1, the first method is to bond a weight (22) to the ring (21) after the color wheel is connected to a driving motor (10). Referring to FIG. 2, the second method is to remove weight by forming a recess (23) on the ring (21). For the first method, due to the weight (22) protruding from the surface unexpected wind noise may arise. For the second method, we found that it is difficult to precisely remove the weight to reach a perfect rotational balance on the ring (21).

As shown in FIG. 3, the invention disclosed in US Patent Publication No. 2003/0035218 A1, has a ring (21) of color filter (20) with an annular groove (24) on the face which is opposite to the side of motor (10). The function of the annular groove (24) is to add weight (25) to reach a rotational balance.

There are several factors could led to the rotational unbalance of a color wheel. For instance, most of the shafts (31) of driving motors are naturally unbalanced in rotation, or the color filter which may also not be bonded in perfect position, or the thickness of adhesive layer may be unevenly formed under the color filters. These are all variable factors to the quality of the color wheel. Therefore, the known methods for balancing a color wheel include adjusting the balance after the color wheel is assembled with driving motor. As shown in FIG. 1 to FIG. 3, the color wheels easily show defects. In a worse case, a wind cut noise may also be generated.

SUMMARY OF THE INVENTION

It is one object of the present invention to provide a method for color wheel assembly, including measuring and adjusting the unbalance of the color wheel and the motor before the assembly.

In accordance with the present invention, the method may comprise the steps of: (a), measuring the rotational unbalance vector of a driving motor, including its unbalance amount and direction; (b), adjusting the unbalance of a color wheel to make its unbalance amount be the same as the driving motor; and (c), connecting the color wheel to the driving motor so that the unbalance direction is opposite to each other to reach a balance. According to the present invention, an embodiment of the color wheel structure may includes a set of color filters and a ring, before starting the assembly, adjusting the unbalance vector of the ring and motor shaft first, and then to assemble it and make the direction of unbalance vectors opposite each other.

DESCRIPTION OF THE DRAWINGS

The above description or other characteristics, objects, features and advantages of the present invention will become more apparent upon consideration of the following detailed description, having reference to the accompanying drawings wherein.

DETAILED DESCRIPTION OF THE PREFERRED EMBODIMENTS

Figure 1:
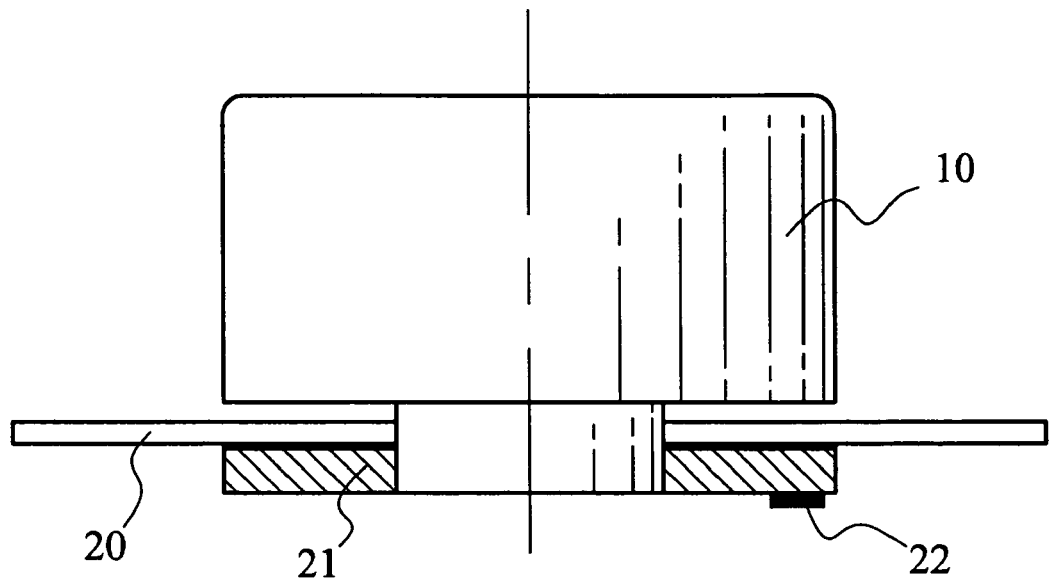
FIG. 1 is a cross-sectional view illustrating an existing color wheel installed with a motor.
Figure 2:
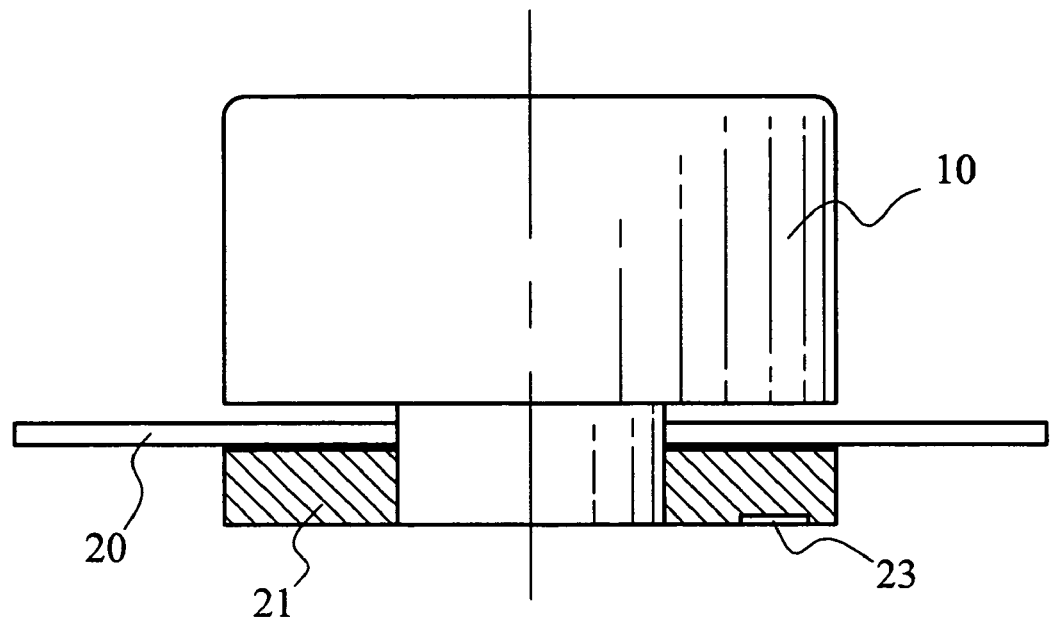
FIG. 2 is a cross-sectional view illustrating another existing color wheel installed with a motor.
Figures 3, 4:
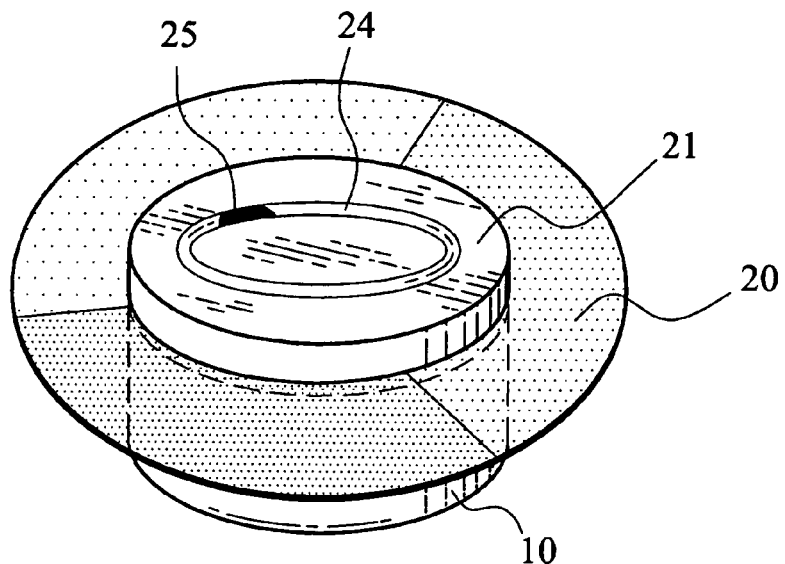
FIG. 3 is a perspective view illustrating another existing color wheel installed with a motor.
FIG. 4 is a block diagram showing the steps for balancing the color wheel in accordance with the present invention.
Figure 5:
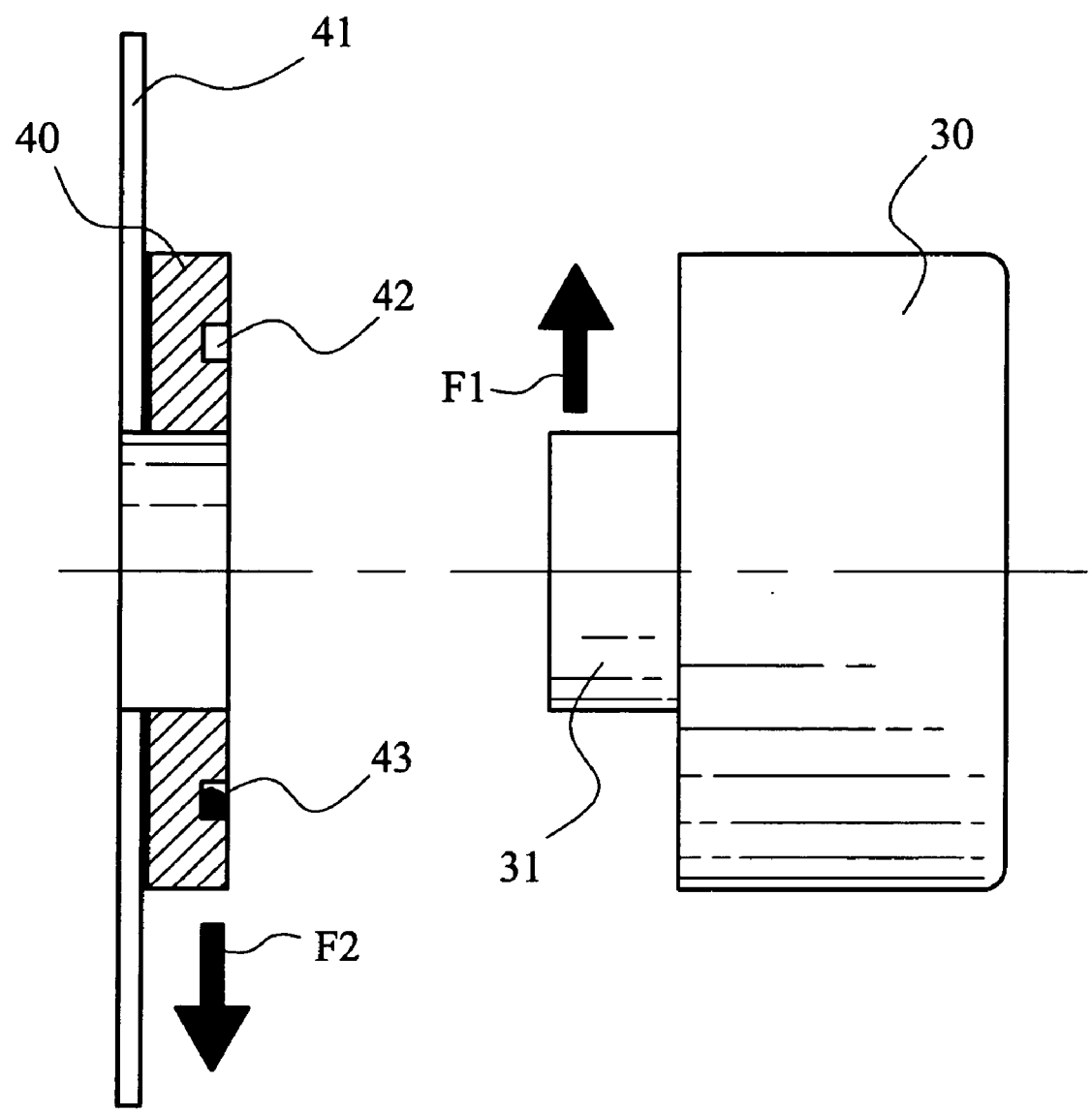
FIG. 5 illustration the structure of the color wheel in accordance with the present invention.

As shown in FIG. 4 and FIG. 5, an embodiment of color wheel in accordance with the present invention, may comprise a ring (40) and a set of color filters (41). Preferably, an annular grove (42) is formed on the ring (40). The annular groove (24) of FIG. 3 is the same as that disclosed in US patent publication No. 2003/0035218 A1, with the annular groove (24) on the ring (21) of the prior art formed on the opposite side to the driving motor (10), which would be visible on the outward appearance of the product. However, the annular groove (42) of the present embodiment would be hidden when assembled with a driving motor (30).

Referring again to FIG. 4. The method in accordance with the present invention, may include: step (a), measuring the rotational unbalance vector that is, a vector which represents the amplitude and direction of the rotational unbalance (F1) from a driving motor (30), included the amount of unbalance and direction of unbalance thereof, preferably; to apply a mark on the shaft (31) of the motor (30) to indicate the direction of rotational unbalance vector (F1); step (b), adjusting the rotational unbalance vector (F2) of the color wheel by adding adhesive (43) into the annual groove (42), and to adjust the unbalance amount of the rotational deviation vector (F2), and make the unbalance amount to be the same of rotational unbalance vector (F1); and step (c), connecting the color wheel to the driving motor (30) and make the direction of rotational unbalance vector (F1) and (F2) be complete opposite to each other to reach an expected balance. Therefore, the rotational unbalance vector (F1) can be balanced by the rotational unbalance vector (F2), so as to reach a perfect rotational balance.

According to the present invention, the ring (40) may made of metal. For instance, the ring (40) is made of copper, having one surface for bonding the color filter (41) with an adhesive. To prevent the problem of adhesive overflow, one may also refer to U.S. Pat. No. 6,618,214, where the ring (40) may use a plurality of concentric grooves on the bonding surface to absorb excessive adhesive and then to lead them to distribute evenly. For other solutions, one may also refer to U.S. Pat. No. 6,598,977, wherein the inventors suggested to create a gap on the ring for applying and absorbing adhesive at a bonding surface of the ring.

For an alternative to step b, for adjusting the rotational unbalance vector (F2) on the color wheel, one may also can refer to U.S. Pat. No. 6,705,733, wherein the ring has a recess on the peripheral for adding a weight to adjust the rotational unbalance vector of color wheel after the assembly of color wheel is completed. Similarly, the ring (40) of the present embodiment can have a recess on the peripheral for adjusting the unbalance amount of rotational unbalance vector (F2). Certainly, for adjusting the rotational unbalance vector (F2), another alternative is to remove material from the ring (40), which would have the same effect to complete the step (b).

This description is intended to provide specific examples of individual embodiments which clearly disclose the present invention. Accordingly, the invention is not limited to these embodiments or to the use of elements having the specific configurations and shapes as presented herein. All alternative modifications and variations of the present invention which fall within the spirit and broad scope of the appended claims are included.

We claim:

1. A method for balancing a color wheel comprising the steps of:
   measuring a rotational unbalance vector of a driving motor, including the amount of rotational unbalance and direction thereof;
   adjusting a rotational unbalance amount of a color wheel to make the amount of unbalance be the same as the driving motor; and
   connecting the color wheel to the driving motor so that the unbalance directions of the motor and color wheel are opposite to each other in order to obtain a balance.

2. The method in accordance with claim 1, wherein the step for adjusting the rotational unbalance of the color wheel includes a step to add a weight on the color wheel.

3. The method in accordance with claim 2, wherein the step for adjusting the rotational unbalance of the color wheel includes a step to add an adhesive material as a weight.

4. The method in accordance with claim 2, wherein the step for adjusting the rotational unbalance of the color wheel includes a step to add a balancing object.

5. The method in accordance with claim 1, wherein the step for adjusting the rotational unbalance of the color wheel includes removing weight from the color wheel.

6. The method in accordance with claim 1, wherein the step for adjusting the rotational unbalance of the color wheel includes fixing a color filter by a ring.

7. The method in accordance with claim 6, wherein the ring has a groove for adding a weight.

8. The method in accordance with claim 7, wherein the groove is created on a side near the driving motor when an assembly thereof is completed.

9. The method in accordance with claim 6, wherein the groove is created on a ring at the same side as a bonding of a color filter.

10. A system for balancing a color wheel, comprising:
    a driving motor having a shaft with a rotational unbalance vector;
    means for measuring the unbalance vector; and
    a ring, connected to the shaft of the driving motor and bonded to a set of color filters thereon, wherein the ring has a groove for adding weight to adjust a rotational unbalance vector thereof to be the same amount of rotational unbalance as that of the driving motor as determined by said means for measuring, and opposite in direction to the driving motor.

11. The color wheel in accordance with claim 10 further including an adhesive layer between the ring and the color filter.

12. The color wheel in accordance with claim 10 wherein the ring is a product of metallic material.

13. The color wheel in accordance with claim 10 wherein the weight is a dried adhesive material with certain weight.

14. The color wheel in accordance with claim 10 wherein the weight is a solid material with certain weight.

15. A system for balancing a color wheel, comprising:
    a driving motor, having a shaft with a rotational unbalance vector, wherein the rotational unbalance vector includes an unbalance amount and an unbalance direction;
    means for measuring the unbalance vector; and
    a ring connected to the shaft of the driving motor and bonded to a set of color filters, wherein the ring having a surface near the driving motor for removing weight and forming a recess for adjusting the rotational unbalance vector, and make the rotational unbalance vector with a same unbalance amount as the driving motor as determined by said means for measuring, and in opposite unbalance direction to the driving motor.

16. The color wheel in accordance with claim 15 wherein the set of color filters is bonded to the ring by a layer of adhesive.

17. The color wheel in accordance with claim 15 wherein the ring is a metallic ring with a central hole for engaging with the shaft of the driving motor.

* * * * *